US012128374B2

(12) United States Patent
Mortensen et al.

(10) Patent No.: US 12,128,374 B2
(45) Date of Patent: Oct. 29, 2024

(54) MIXER FOR A FOOD PRODUCT INCLUDING A DISPLACEABLE STATOR

(71) Applicant: Tetra Laval Holdings & Finance S.A., Pully (CH)

(72) Inventors: Hans Henrik Mortensen, Noerresundby (DK); Sten Andersen, Hammel (DK); Frederik Larsen, Dronninglund (DK)

(73) Assignee: Tetra Laval Holdings & Finance S.A., Pully (CH)

(*) Notice: Subject to any disclaimer, the term of this patent is extended or adjusted under 35 U.S.C. 154(b) by 716 days.

(21) Appl. No.: 17/298,752

(22) PCT Filed: Dec. 10, 2019

(86) PCT No.: PCT/EP2019/084493

§ 371 (c)(1),
(2) Date: Jun. 1, 2021

(87) PCT Pub. No.: WO2020/120504

PCT Pub. Date: Jun. 18, 2020

(65) Prior Publication Data

US 2022/0054997 A1 Feb. 24, 2022

(30) Foreign Application Priority Data

Dec. 13, 2018 (EP) .................................... 18212253

(51) Int. Cl.
*B01F 33/453* (2022.01)
*B01F 27/271* (2022.01)
(Continued)

(52) U.S. Cl.
CPC ...... *B01F 33/4533* (2022.01); *B01F 27/2714* (2022.01); *B01F 33/4534* (2022.01); *B01F 35/4112* (2022.01); *B01F 2101/06* (2022.01)

(58) Field of Classification Search
CPC .... B01F 23/56; B01F 27/812; B01F 25/4511; B01F 27/27; B01F 27/8111; B01F 33/862;
(Continued)

(56) References Cited

U.S. PATENT DOCUMENTS 8,911,141 B2 * 12/2014 Cheio De Oliveira ...................... B01F 27/808 366/264
8,960,993 B2 * 2/2015 Cheio De Oliveira . B01F 23/53 366/264
(Continued)

FOREIGN PATENT DOCUMENTS

CN 1571691 A 1/2005
CN 104640487 A 5/2015
(Continued)

OTHER PUBLICATIONS

International Search Report for corresponding Application No. PCT/EP2019/084493, mailed Mar. 23, 2020.
(Continued)

*Primary Examiner* — Charles Cooley
(74) *Attorney, Agent, or Firm* — Renner, Otto, Boisselle & Sklar, LLP

(57) ABSTRACT

A mixer for a food product includes a vessel, an stator arranged in the vessel, and a rotor to rotate the food product relative the stator. The stator is displaceable relative the rotor by a movement along a stator guide. The stator guide includes an interior cavity being enclosed by a wall extending into the vessel, and a first magnetizable material is arranged inside the cavity. The stator includes a second magnetizable material, wherein a magnetic field between the first and second magnetizable materials generates a force that moves the stator along the stator guide for displacement of the stator relative the rotor.

15 Claims, 5 Drawing Sheets

Figure 1:
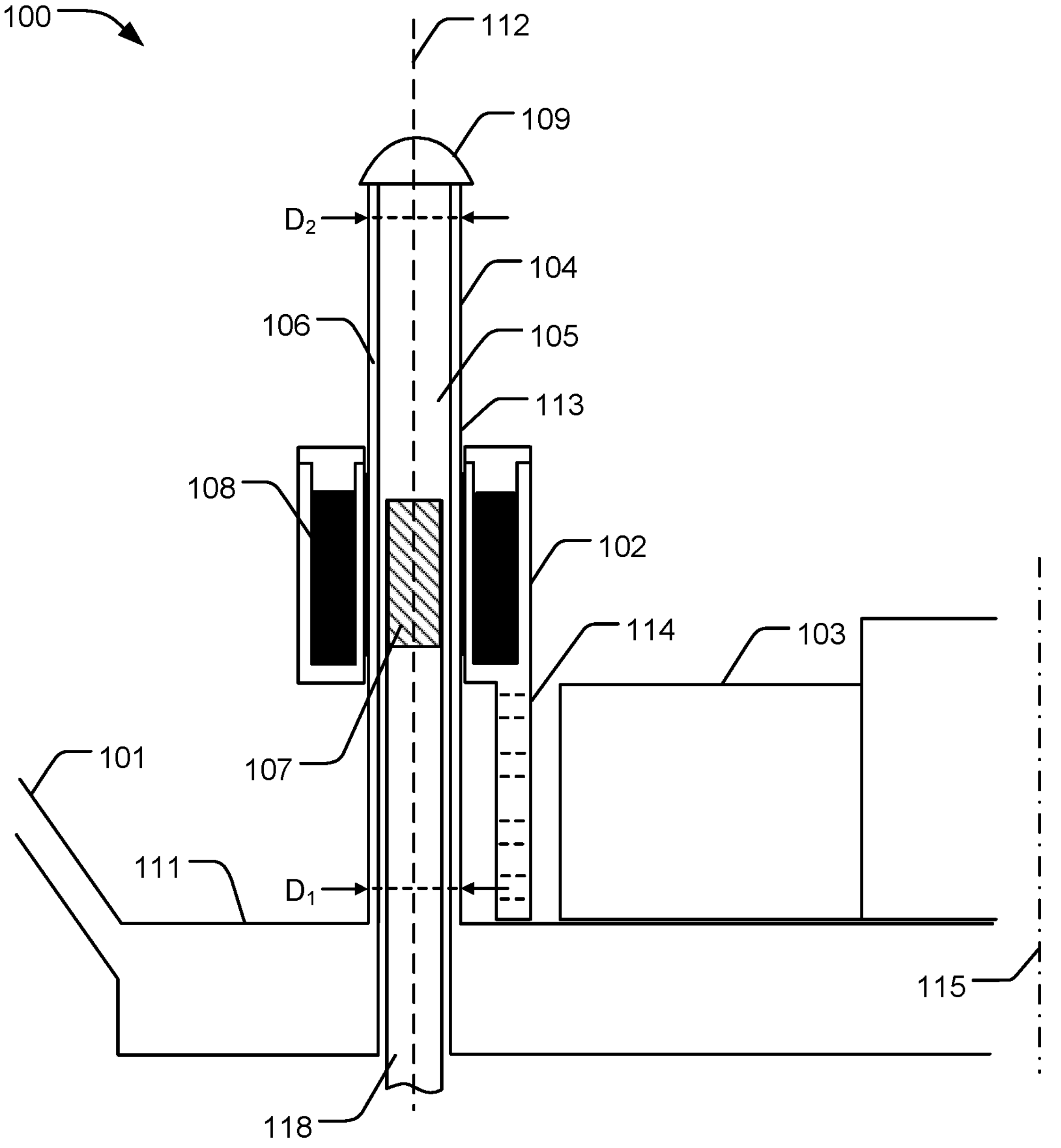

(51) Int. Cl.
*B01F 35/41* (2022.01)
*B01F 101/06* (2022.01)

(58) Field of Classification Search
CPC ........ B01F 27/40; B01F 27/41; B01F 27/411; B01F 27/412; B01F 33/4533; B01F 33/4534; B01F 35/4112; B01F 2101/06; B01F 35/146; B01F 27/2724; B01F 27/2714
USPC .................................................. 366/302, 305
See application file for complete search history.

(56) References Cited

U.S. PATENT DOCUMENTS

| | | | | |
|---|---|---|---|---|
| 2004/0190373 | A1* | 9/2004 | Colding-Kristensen | B01F 27/812 366/314 |
| 2005/0202095 | A1 | 9/2005 | Daiziel et al. | |
| 2015/0283526 | A1* | 10/2015 | Colding-Kristensen | B01F 25/52 366/192 |
| 2022/0054997 | A1* | 2/2022 | Mortenssen | B01F 35/146 |

FOREIGN PATENT DOCUMENTS

| | | | | |
|---|---|---|---|---|
| CN | 107427159 | A | 12/2017 | |
| CN | 107847084 | A | 3/2018 | |
| CN | 107847888 | A | 3/2018 | |
| EP | 1 395 354 | B1 | 11/2007 | |
| EP | 3 400 808 | A1 | 11/2018 | |
| EP | 3666373 | A1 * | 6/2020 | B01F 13/0854 |

OTHER PUBLICATIONS

Extended European Search Report for corresponding Application No. 18212253.1, dated Jul. 22, 2019.

* cited by examiner

MIXER FOR A FOOD PRODUCT INCLUDING A DISPLACEABLE STATOR

TECHNICAL FIELD

The invention relates to a mixer for a food product comprising a vessel, a stator arranged in the vessel and a rotor to rotate the food product relative the stator.

BACKGROUND

Rotor-stator mixers are commonly employed in process industries to carry out liquid-liquid homogenisation, dispersion and emulsification as well as solid-liquid dispersion, dissolving and grinding. A variety of different designs exist but their operating principle is basically similar. Stator elements surround a high-speed rotor causing a complex flow pattern with high velocity gradients (high-shear) and turbulence. For certain applications and in certain mixing steps it is often desired to use low-shear mixing, e.g. to maintain integrity of added particles. The latter may be achieved by moving the stator elements away from the rotor outlet stream during the mixing process. The previous solutions require frequent maintenance to comply with hygienic standards. The need for frequent maintenance is typically caused by wear of sealing elements, which may originate from the repeated reciprocating movement of the aforementioned stator elements. Damaged or worn seals may cause the food product to escape the designated mixing space inside the vessel. For cold processes without downstream heat treatment it is typically required to have cleaning systems behind the primary seals to comply with hygienic standards. Such cleaning system add significantly to the complexity and cost of the mixer system. Similar issues are also present for seat valves which are often solved by isolating the process and atmospheric areas by flexible membranes. Such solution is not readily transferable to mixers due to the long movement of the stator (the stroke) and the limited space available. Also, such solution still includes a hygiene risk in case of membrane failure.

SUMMARY

It is an object of the invention to at least partly overcome one or more limitations of the prior art. In particular, it is an object to provide an improved mixer for a food product which is less complex and requires less maintenance, while reducing hygienic risks.

In a first aspect of the invention, this is achieved by a mixer for a food product, comprising a vessel, an stator arranged in the vessel, a rotor to rotate the food product relative the stator, the stator is displaceable relative the rotor by a movement along a stator guide, the stator guide comprises an interior cavity being enclosed by a wall extending into the vessel, a first magnetizable material arranged inside the cavity, the stator comprises a second magnetizable material, wherein a magnetic field between the first and second magnetizable materials generates a force that moves the stator along the stator guide for displacement of the stator relative the rotor.

Having a stator guide comprising interior cavity being enclosed by a wall extending into the mixer vessel, a first magnetizable material arranged inside the cavity, and a stator comprising a second magnetizable material provides for moving the stator along the stator guide without the need for an actuator element being movable through as sealed opening into the vessel. This provides for less movable parts and sealing elements, and a more hygienic solution.

Still other objectives, features, aspects and advantages of the invention will appear from the following detailed description as well as from the drawings.

DRAWINGS

Embodiments of the invention will now be described, by way of example, with reference to the accompanying schematic drawings.

Figure 2A:
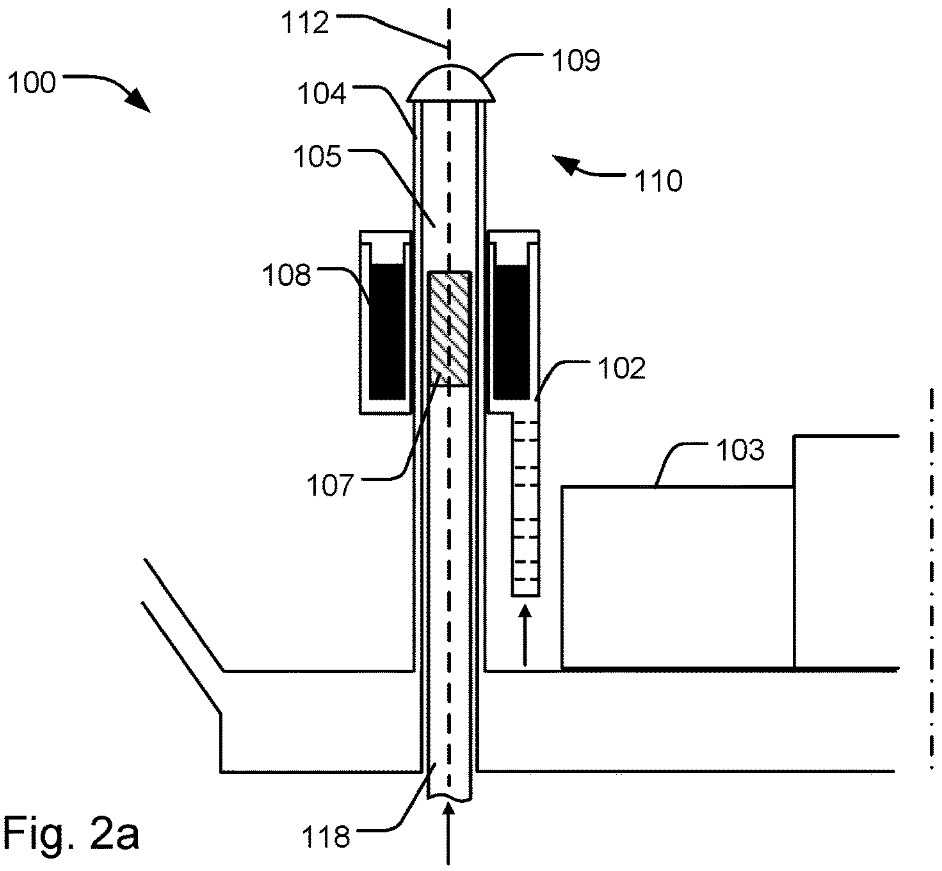
Figure 2B:
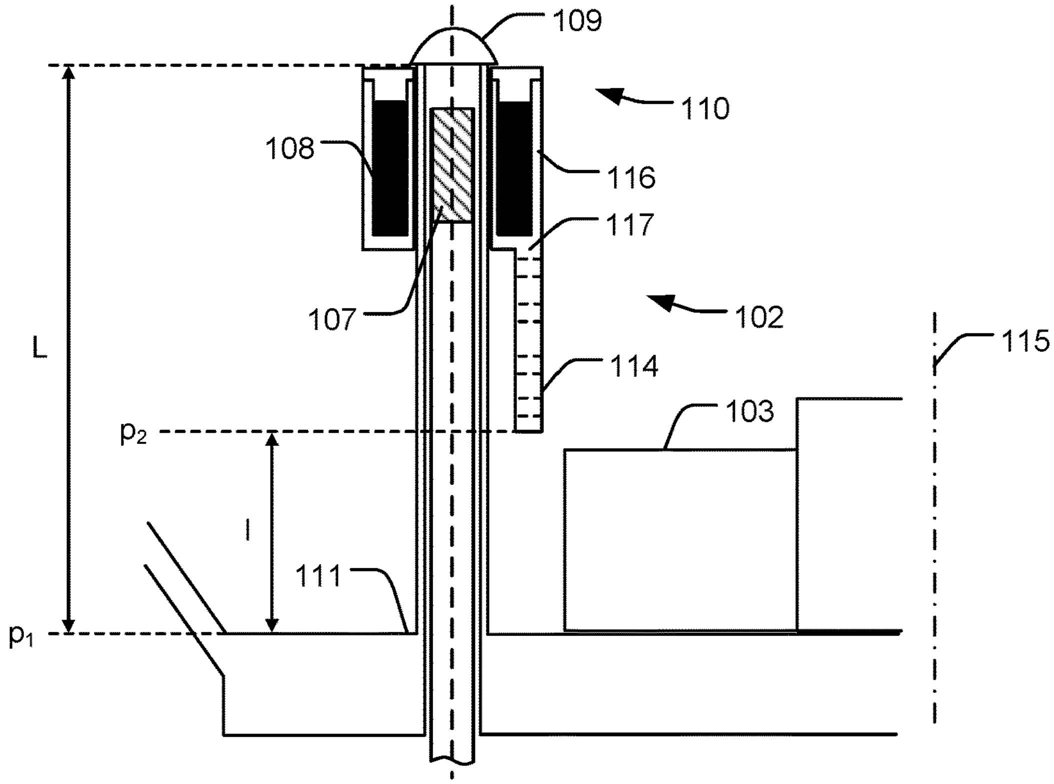
Figure 3A:
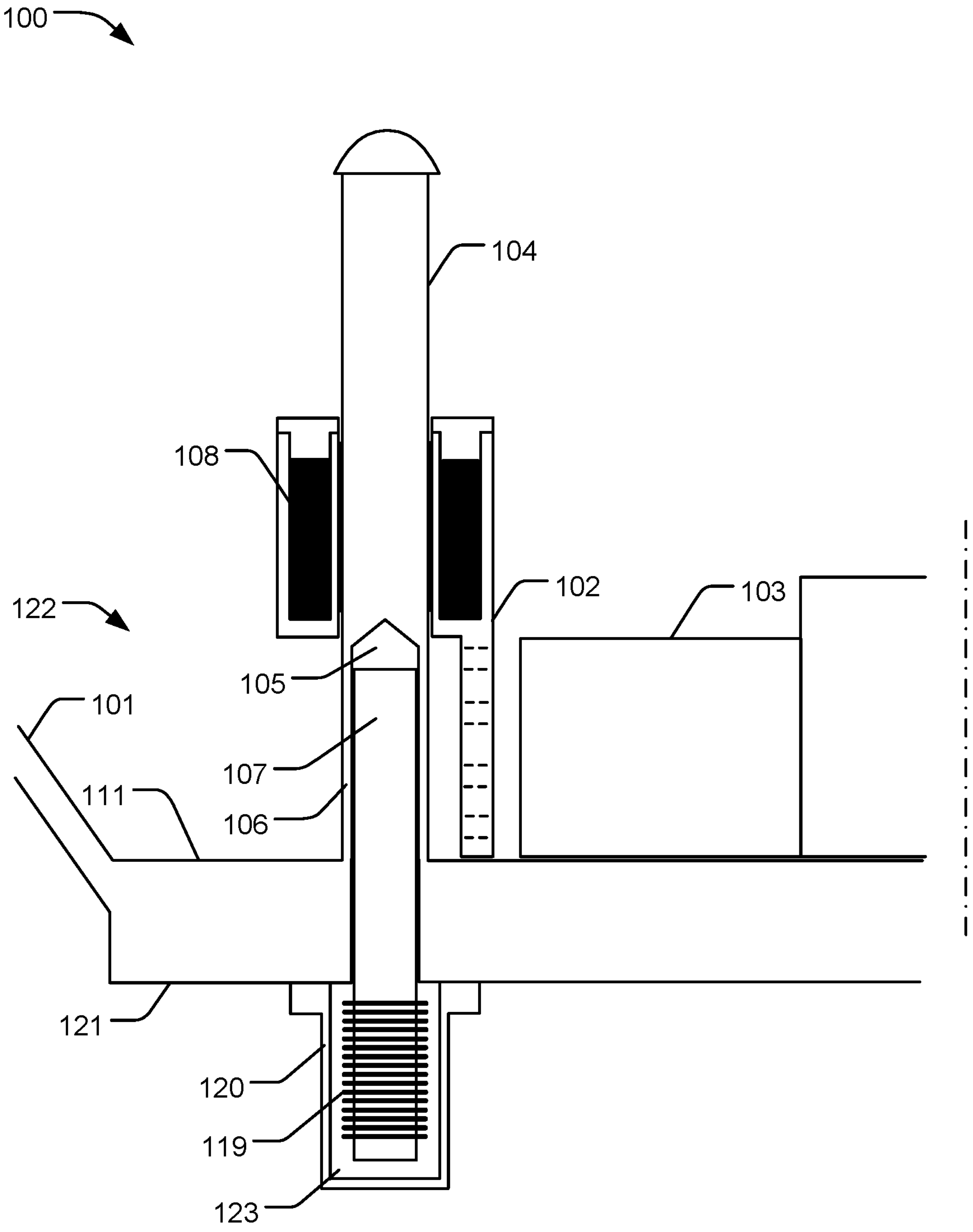
Figure 3B:
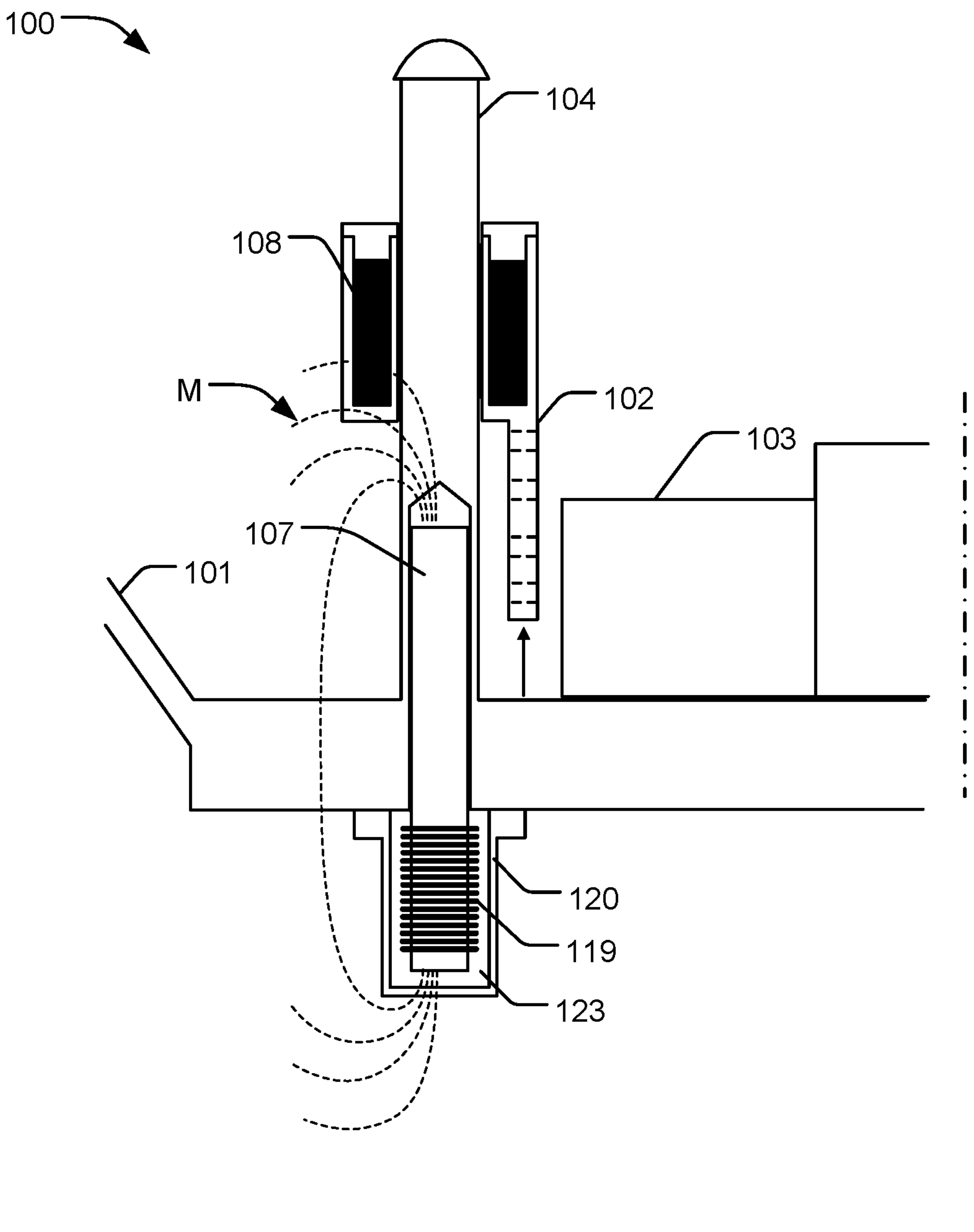
Figure 4A:
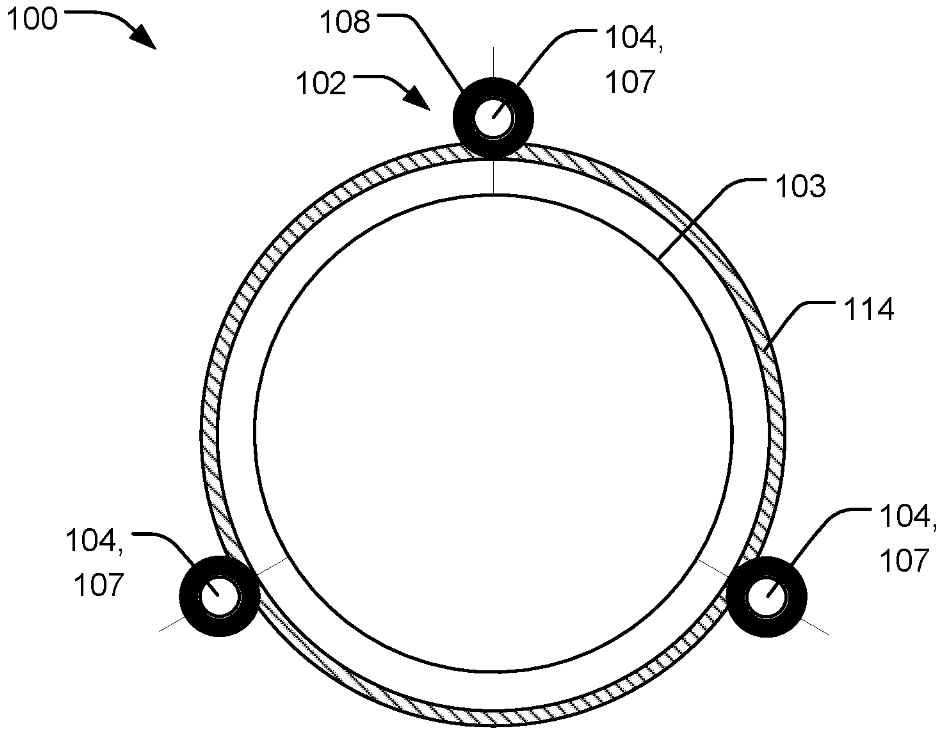
Figure 4B:
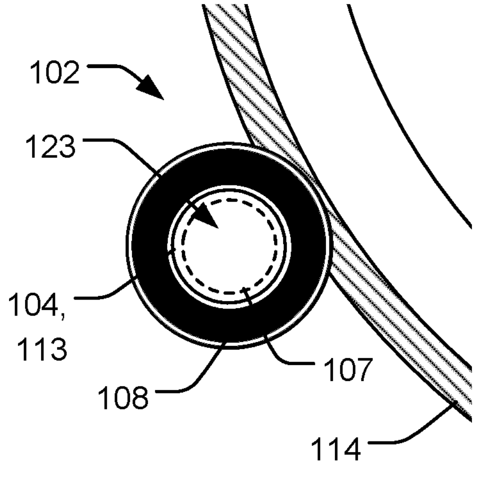
Figure 4C:
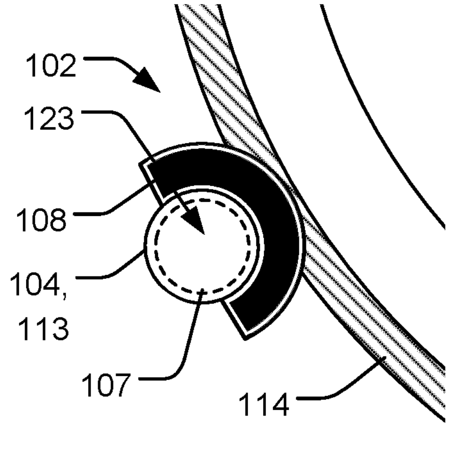

FIG. 1 is a cross-sectional side view of a mixer for a food product comprising a vessel, a stator arranged in the vessel and a rotor to rotate the food product relative the stator;

FIG. 2*a* is a cross-sectional side view of the mixer in FIG. 1 where the stator is moved along a stator guide;

FIG. 2*b* is a cross-sectional side view of the mixer in FIG. 1 where the stator has been moved along a stator guide to an upper position;

FIG. 3*a* is a cross-sectional side view of a mixer for a food product comprising a vessel, a stator arranged in the vessel and a rotor to rotate the food product relative the stator;

FIG. 3*b* is a cross-sectional side view of the mixer in FIG. 3*a* where the stator is moved along a stator guide; and FIGS. 4*a-c* are schematic top-down views of a mixer comprising an annular stator supported by stator guides.

DETAILED DESCRIPTION

Embodiments of the invention will now be described more fully hereinafter with reference to the accompanying drawings, in which some, but not all, embodiments of the invention are shown. The invention may be embodied in many different forms and should not be construed as limited to the embodiments set forth herein.

FIG. 1 is a schematic illustration, in a cross-sectional side view, of a detail of a mixer 100 for a food product, such as liquid food. The mixer 100 comprises a vessel 101 and a stator 102 arranged in the vessel 101. FIG. 1 shows primarily a bottom portion of the vessel 101 and part of a sidewall thereof, i.e. where reference numeral 101 is indicated. It should be understood however that the vessel 101 may have various shapes for enclosing the food product to be mixed. The mixer 100 comprises a rotor 103 to rotate the food product relative the stator 102. Rotational axis 115 of the rotor is indicted to the right in FIG. 1. The stator 102 is thus stationary in the sense it does not rotate relative the vessel 101, while the rotor 103 rotates relative the stator 102 and vessel 101. The rotor 103 rotates the food product in the vessel thereby creating a centrifugal force which forces the food to flow radially outwards towards the stator 102. The flow of food may be forced through perforations 114 in the stator 102, causing a complex flow pattern with high velocity gradients (high-shear) and turbulence. For some applications and in certain mixing steps it may be desired to use low-shear mixing e.g. to maintain integrity of added particles. The stator 102 is displaceable relative the rotor 103 by a movement along a stator guide 104, as schematically illustrated in FIGS. 2*a-b*. In FIG. 2*c* the stator 102 has moved a distance (I) relative a bottom wall 111 of the vessel 101 while FIG. 2*b* shows an intermediate position of the stator 102, between the end points shown in FIGS. 2*a* and 2*c*. Moving the stator 102 as shown in FIGS. 2*b-c* allows for attaining a low-shear mixing mode as mentioned above.

Turning again to FIG. 1, the stator guide 104 comprises an interior cavity 105 which is enclosed by a wall 106 extending into the vessel 101. The lower portion of the wall 106 may be attached to the bottom wall 111 of the vessel 101, i.e. fixed to the bottom wall 111. The stator guide 104 is thus stationary relative the vessel 101. The stator guide 104 comprises a first magnetizable material 107 arranged inside the cavity 105, as schematically indicated in FIG. 1, or as shown in FIG. 3*a* described in more detail below. The stator 102, which is movable along the stator guide 104, comprises a second magnetizable material 108. A magnetic field between the first and second magnetizable materials 107, 108, generates a force that moves the stator 102 along the stator guide 104 for displacement of the stator 102 relative the rotor 103. In the example shown in FIGS. 2*a-b*, the first magnetizable material 107 in the cavity 105 is attracted to the second magnetizable material 108 of the stator 102 via a magnetic field therebetween. The magnetic force between the first and second magnetizable materials 107, 108, provides for influencing the position of the stator 102, e.g. by varying the position of the first magnetizable material 107 in the cavity 105 as in the example of FIG. 2*a*, or by varying the strength of the magnetic field as in the example of FIG. 3*b* described in further detail below. The magnetizable material should be construed in the normal meaning, i.e. as a material which can be attracted by a magnetic field, e.g. ferromagnetic or paramagnetic materials, or a material which can be magnetized to produce a magnetic field itself, such as a permanent magnet, or by induced magnetism by an electric current, such as an electromagnet. Permanent magnets and electromagnets are typically also comprised of ferromagnetic materials.

Moving the stator 102 along the stator guide 104 by utilizing the magnetic force between the first and second magnetizable materials 107, 108, provides for a facilitated control of the position of the stator 102 with a minimum of movable components inside of the vessel 101, since the stator guide 104 may be fixed to the vessel 101. Prior art solutions with actuator pistons extending through the bottom wall 111 of the vessel 101 for attachment to a stator needs to be sealed from the outside environment. Such seals may be subjected to wear due to the repeated movement of the actuator piston, which may necessitate frequent maintenance. Thus, having a first magnetizable material 107 arranged inside the cavity 105, and a stator 102 comprising a second magnetizable material 108 provides for moving the stator 102 along the stator guide 104 without the need for an actuator element being movable through a sealed opening into the vessel 101. This provides for reducing the number of sealing elements of the mixer 100, and a more hygienic solution which needs less maintenance.

The mixer 100 may comprise an actuator 118 arranged inside the cavity 105, where the actuator 118 is movable inside the cavity 105 along a longitudinal direction 112 of the stator guide 104, as illustrated in FIGS. 2*a-b*. The first magnetizable material 107 may comprise a permanent magnet 107 fixed to the actuator 118. Hence, the permanent magnet 107 may be movable along the longitudinal direction 112 so that the magnetic field between the permanent magnet 107 and the second magnetizable material 108 generates a force to move the stator 102 along the stator guide 104. It is also conceivable that the second magnetizable material 108 comprises a permanent magnet 108, and that the first magnetizable material 107 is not a permanent magnet, but comprises magnetizable material, such as a ferromagnetic material, which is attracted to the permanent magnet 108. Hence, the second magnetizable material 108 may comprise a second permanent magnet 108 in one example. In another example, both the first and second magnetizable material 107, 108, may comprise permanent magnets 107, 108, in which case the permanent magnets 107, 108, are arranged so that respective opposite magnetic poles thereof are matched for coupling and attracting the permanent magnets 107, 108, to each other. Regardless, having an actuator 118 arranged inside the cavity 105, to control the position of the first magnetizable material 107, allows also for a facilitated control of the position of the second magnetizable material 108 due to the magnetic field and the associated force coupling the first and second magnetizable materials 107, 108, together.

In another example, schematically illustrated in FIGS. 3*a-b*, the mixer 100 comprises an electrical coil 119 arranged around at least a portion of the first magnetizable material 107. The electrical coil 116 may be coupled to a power supply (not shown), so that a current flows through the electrical coil 116. The current through the electrical coil 116 induces a magnetic field (M) between the first and second magnetizable materials 107, 108, so that a force is generated which moves the stator 102 along the stator guide 104, as illustrated in FIG. 3*b*. I.e. the first magnetizable material 107 and the electrical coil 116 wound around the first magnetizable material 107 forms an electromagnet which may generate a magnetic field (M) that repels the second magnetizable material 108 attached to the stator 102. The strength of the generated magnetic field (M) may be varied, e.g. by varying the current through the electrical coil 119, so that the force acting upon the second magnetizable material 108 and the stator 102 attached thereto is varied, and thereby the displacement and position of the stator 102 along the stator guide 104. The direction of the current through the electrical coil 119 may be varied so that the polarization of the magnetic field (M) can be switched. I.e. in one example, the stator 102 may be repelled by the magnetic field (M) and displaced as shown in FIG. 3*b* for a first direction of the current, and upon switching an opposite direction of the current, the stator 102 is instead attracted and pushed to the bottom wall 111. FIG. 3*b* show the stator 102 being moved to a position corresponding to the position of the stator 102 in FIG. 2*a*. The magnetic field (M) may also repel the second magnetizable material 108 and push the stator 102 to the top position corresponding to the position shown in FIG. 2*b*. Having an electromagnet as described above in the stator guide 104 provides for an effective and facilitated control of the position of the stator 102 relative the rotor 103, with the advantages as mentioned above with less maintenance and compliance with hygienic requirements in a facilitated manner. The wall 106 enclosing the cavity 105, in which the first magnetizable material 107 is arranged, is attached to the bottom wall 111 of the vessel 101 as described in relation to the example in FIG. 1. Thus, having a stationary stator guide 104 directly attached to the bottom wall 111 dispense with the need of having to seal the stator guide 104 towards the outside atmosphere. The number of sealing elements, which may be worn over time, may thus be reduced.

The second magnetizable material 108 may comprise a second permanent magnet 108. The magnetic poles of the second permanent magnet 108 may thus be arranged so that the magnetic field (M) repels the second permanent magnet 108 as the magnetic field (M) is turned on.

FIGS. 3*a-b* show the first magnetizable material 107 extending a distance along the cavity 105 of the stator guide 104 into the vessel 101. It is conceivable that the distance by which the first magnetizable material 107 extends into the vessel 101 may be varied depending in the application and overall dimensions of the mixer 100 while providing for the advantageous effects as described above. In some examples it is conceivable that a sufficiently strong magnetic field (M) may be generated to push the stator 102 along the stator guide 104 even though the electromagnet and the first magnetizable material 107 thereof might be positioned completely outside the vessel 101. Extending the first magnetizable material 107 a distance into the vessel as shown in FIGS. 3*a-b* may however provide for a stronger magnetic file (M) and a facilitated positioning of the stator 102 in some examples.

The first magnetizable material 107 may extend through a bottom wall 111 of the vessel 101 and into an enclosure 120 arranged on an opposite side 121 of the bottom wall 111 with respect to an interior 122 of the vessel 101, as schematically illustrated in FIG. 3*a*. The electrical coil 119 may be wound around the first magnetizable material 107 inside the enclosure 120. This provides for shielding of the electrical coil 119 from the surroundings. An isolating material 112 may be arranged in the enclosure 120 for further shielding.

The stator guide 104 may comprise a stop 109 arranged at a top portion 110 of the stator guide 104 to limit movement of the stator 102 along a length (L) of the stator guide 104 between a bottom wall 111 of the vessel 101 and the top portion 110. FIG. 2*b* illustrates the stop 109 limiting the movement of the stator 102 along the stator guide 104. The stop 109 may comprise a flange of increased diameter which is larger than the diameter of an opening of the stator 102 which is positioned around the stator guide 104, for sliding along the stator guide 104. A robust and effective control of the maximum displacement of the stator 102 along the stator guide 104 may thus be attained.

The wall 106 of the stator guide 104 may be integrally fixed with the bottom wall 111 of the vessel 101, e.g. by soldering, an adhesive, or other fixing elements. It is conceivable that the stator guide 104 is removably fixed to the bottom wall 111 by e.g.

screws or bolts. A fixed connection between the stator guide 104 and the bottom wall 111 of the vessel 101 provides for the advantages as described above, e.g. avoiding sealing elements at the bottom of the vessel 101, or avoiding sealing elements arranged to seal a movable actuator piston which causes increased wear.

The stator guide 104 may extend along a longitudinal direction 112 as shown in e.g. FIG. 1. Although the stator guide 104 extends perpendicular to the bottom wall 111 of the vessel 101 in the illustrated examples, it should be understood that in some applications and examples the longitudinal direction 112 of the stator guide 104 may form different angles with the vessel 101, while providing for the advantageous benefits as described above. The stator guide 104 may have a varying outer dimeter $D_1$, $D_2$, along the longitudinal direction 112. In one example, $D_2$ is less than $D_1$. The spacing between the inner diameter of the opening of the stator 102, which receives and moves along the stator guide 104, is thus larger in the upper position of the stator guide 104 at $D_2$ (FIG. 2*b*) than at the lower position at $D_1$ (FIG. 1). This provides for a facilitated removal of any food product which may be accumulated between the stator 102 and the stator guide 104, since at the upper position at $D_2$ the aforementioned spacing is increased which provides for a facilitated flushing away of such accumulated food product. I.e. the flow of food product can be more easily circulated through the increased spacing. The need for maintenance may thus be reduced even further.

The stator guide 104 may have a varying cross-sectional shape along the longitudinal direction 112. The shape of the cross-section at the top portion 110 may thus be different than the shape of the cross-section closer to the bottom wall 111 of the vessel 101. In one example, the cross-section may be substantially circular in the latter position, e.g. where the stator 102 is arranged in FIG. 1, while the cross-section may comprise at least partly flat surfaces at the top portion 110, e.g. where the stator 102 is arranged in FIG. 2*b*. As in the example with varying diameter $D_1$, $D_2$, the varying shape of the cross-section provides for a facilitated flushing away of any accumulated food product between the stator 102 and the stator guide 104. I.e. in the mentioned example, having a cross-section with partly flat surfaces, or any recess or concave portion of the stator guide 104, provides for an increased spacing between the stator guide 104 and the stator 102 which may have a substantially circular opening around the stator guide 104. The varying cross-section may in some examples be combined with a varying diameter $D_1$, $D_2$, as described above. It is conceivable that the outer cross-section of the stator guide 104 and the inner cross-section of an opening 123 in the stator 102 may assume different shapes, such as circular or rectangular or any variation or combination of such shapes. The opening 123 in the stator 102 may also have different angular extensions around the stator guide 104 as described in more detail below in relation to FIGS. 4*b-c*.

The stator 102 may thus be movable along a guide surface 113 of the stator guide 104, as shown in e.g. FIG. 4*c*. The second magnetizable material 108 may be arranged to conform at least partly to the shape of the guide surface 113. I.e. the second magnetizable material 108 may follow the shape of the guide surface 113, e.g. by being at least partly arranged around the circular shape of the guide surface 113 as shown in FIG. 4*c*, or by completely surrounding the guide surface 113 as shown in FIG. 4*b*. This provides for a compact cross-section of the stator 102 as well as an effective coupling of the magnetic fields between the first and second magnetizable materials 107, 108. The stator 102 may comprise a cavity in which the second magnetizable material 108 is arranged, in a fixed position relative the stator 102.

The second magnetizable material 108 may be arranged in a C-shape or a U-shape around the guide surface 113, as shown in FIG. 4*c*. This may in some applications provide for a further facilitated maintenance of the stator 102 and stator guide 104, since at least part of the guide surface 113 may be permanently exposed to the surrounding fluid, which may further prevent any accumulation of food product between the stator 102 and stator guide 104. This may also provide for a facilitated assembly and disassembly of the stator 102 from the stator guide 104.

The second magnetizable material 108 may be arranged in an annular shape around the guide surface 113, as shown in FIG. 4*b*. This may provide for a further increased stability of the position of the stator 102 relative the stator guide 104 in some applications.

The stator 102 may comprise an annular perforated wall 114 arranged around the rotor 103, as schematically shown in the cross-sectional view of FIG. 2*b* and in the top-down view of FIG. 4*a*. The stator 102 may be movable between a lower position ($p_1$) and an upper position ($p_2$) by the force generated by the magnetic field as described above. Hence, as shown in FIG. 2*b*, a distance (I) between the annular perforated wall 114 and the bottom wall 111 of the vessel 101 along a rotational axis 115 of the rotor 101 is larger in the upper position ($p_2$) than in the lower position ($p_1$). This provides for an effective control of the mixing mode, between a high-shear mixing mode, where fluid may be forced through perforations 114 of the stator (FIG. 1), and a low-shear mixing mode, where the stator 102 is raised to the upper position ($p_2$) as shown in FIG. 2*b*. Thus, the distance $I=p_2-p_1$ may correspond substantially to the height of the rotor 103 above the bottom wall 111 of the vessel 101.

The annular perforated wall 114 may be movable along at least three stator guides 104 arranged around the rotor 103, as schematically illustrated in FIG. 4*a*. This provides for a stable and reliable guiding of the stator 102 and the annular perforated wall 114 attached thereto along the stator guide 104. Although the example in FIG. 4*a* shown a configuration of the second magnetizable material 108 corresponding to the example in FIG. 4*b*, it should be understood that in another example, the second magnetizable material 108 may be arranged in a C- or U-shape as shown in FIG. 4*c* when having three stator guides 104 as shown in the top-down view of FIG. 4*a*. Having at least three stator guides 104 provides still for an effective and stable guiding of the stator 102 in case of having a C- or U-shape as shown in FIG. 4*c*.

The second magnetizable material 108 may be fixed to a support 116 being movable along the stator guide 104, as shown in e.g. FIG. 2*b*. As mentioned, the stator 102 may comprises an annular perforated wall 114 arranged around the rotor 103. The perforated wall 114 may be fixed to a bottom part 117 of the support 116. In this case, the perforated wall 114 is arranged between the second magnetizable material 108 and the bottom wall 111 of the vessel 101, as shown in e.g. FIG. 1, 2*a*-*b*. It is conceivable however that the perforated wall 114 may be arranged in other locations relative the second magnetizable material 108. In one example the annular perforated wall 114 may be attached to an upper section of the support 116 so that the second magnetizable material 108 is arranged between the annular perforated wall 114 and the bottom wall 111. The latter arrangement may be advantageous if the rotor 103 would be placed a distance from the bottom wall 111 into the vessel 101. Regardless, the annular perforated wall 114 may be arranged to be displaceable relative the rotor 103 as described above, from an overlapping position along the rotational axis 115 to an off-set position as shown in FIG. 2*b*.

The mixer 100 may comprise a further magnet arranged inside the vessel 101 for collecting any metal particles. This may provide for further enhancing the hygienic safety measures.

From the description above follows that, although various embodiments of the invention have been described and shown, the invention is not restricted thereto, but may also be embodied in other ways within the scope of the subject-matter defined in the following claims.

The invention claimed is:

1. A mixer for a food product, comprising:
- a vessel,
- a stator arranged in the vessel,
- a rotor to rotate the food product relative the stator,
- the stator is displaceable relative the rotor by a movement along a stator guide,
- the stator guide comprises
  - an interior cavity being enclosed by a wall extending into the vessel,
  - a first magnetizable material arranged inside the cavity,
- the stator comprises a second magnetizable material,
- wherein a magnetic field between the first and second magnetizable materials generates a force that moves the stator along the stator guide for displacement of the stator relative the rotor; and
- an actuator arranged inside the cavity, the first magnetizable material being fixed to the actuator, whereby the actuator is movable inside the cavity along the stator guide to move the first magnetizable material along the stator guide so that the magnetic field between the first magnetizable material and the second magnetizable material generates the force to move the stator along the stator guide.

2. The mixer according to claim 1, wherein the stator guide comprises a stop arranged at a top portion of the stator guide to limit movement of the stator along a length of the stator guide between a bottom wall of the vessel and the top portion.

3. The mixer according to claim 2, wherein the wall of the stator guide is integrally fixed with the bottom wall of the vessel.

4. The mixer according to claim 1, wherein the stator guide extends along a longitudinal direction and has a varying outer dimeter along the longitudinal direction, the longitudinal direction being along a length of the stator guide.

5. The mixer according to claim 1, wherein the stator guide extends along a longitudinal direction and has a varying cross-sectional shape along the longitudinal direction, the longitudinal direction being along a length of the stator guide.

6. The mixer according to claim 1, wherein the stator is movable along a guide surface of the stator guide, the second magnetizable material is arranged to conform at least partly to the shape of the guide surface.

7. The mixer according to claim 6, wherein the second magnetizable material is arranged in a C-shape or a U-shape around the guide surface.

8. The mixer according to claim 6, wherein the second magnetizable material is arranged in an annular shape around the guide surface.

9. The mixer according to claim 1, wherein the stator comprises an annular perforated wall arranged around the rotor, the stator being movable between a lower position and an upper position by the force generated by said magnetic field, wherein a distance between the annular perforated wall and a bottom wall of the vessel along a rotational axis of the rotor is larger in the upper position than in the lower position.

10. The mixer according to claim 9, wherein stator guide comprises at least three stator guide components arranged around the rotor, and the annular perforated wall is movable along the at least three stator guides components.

11. The mixer according to claim 1, wherein the second magnetizable material is fixed to a support being movable along the stator guide, and the stator comprises an annular perforated wall arranged around the rotor, the perforated wall is fixed to a bottom part of the support, whereby the perforated wall is arranged between the second magnetizable material and a bottom wall of the vessel.

12. The mixer according to claim 1, wherein the first magnetizable material comprises a permanent magnet.

13. The mixer according to claim 12, wherein the second magnetizable material (108) comprises a second permanent magnet.

14. The mixer according to claim 1, comprising an electrical coil arranged around at least a portion of the first magnetizable material, wherein a current through the electrical coil induces a magnetic field between the first and second magnetizable materials to generate a force to move the stator along the stator guide.

15. The mixer according to claim 14, wherein the first magnetizable material extends through a bottom wall of the vessel and into an enclosure arranged on an opposite side of the bottom wall with respect to an interior of the vessel, wherein the electrical coil is wound around the first magnetizable material inside the enclosure.

* * * * *